AUTOMATIC TELEPHONE DIALING ALARM DEVICE WITH PEN CARRIER

Original Filed Aug. 22, 1962

INVENTOR.
HARRY CALDWELL.
BY
Wallace P. Lamb
ATTORNEY.

AUTOMATIC TELEPHONE DIALING ALARM DEVICE WITH PEN CARRIER

Original Filed Aug. 22, 1962

6 Sheets-Sheet 2

INVENTOR.
HARRY CALDWELL
BY
Wallace P. Lamb
ATTORNEY.

INVENTOR.
HARRY CALDWELL.
BY
Wallace P. Lamb
ATTORNEY.

Aug. 16, 1966 H. CALDWELL 3,267,221

AUTOMATIC TELEPHONE DIALING ALARM DEVICE WITH PEN CARRIER

Original Filed Aug. 22, 1962 6 Sheets-Sheet 4

INVENTOR.
HARRY CALDWELL
BY
Wallace P. Lamb
ATTORNEY.

AUTOMATIC TELEPHONE DIALING ALARM DEVICE WITH PEN CARRIER

Original Filed Aug. 22, 1962

INVENTOR.
HARRY CALDWELL.
BY
Wallace P. Lamb
ATTORNEY.

INVENTOR.
HARRY CALDWELL.
BY
Wallace P. Lamb
ATTORNEY.

United States Patent Office 3,267,221
Patented August 16, 1966

3,267,221
AUTOMATIC TELEPHONE DIALING ALARM DEVICE WITH PEN CARRIER

Harry Caldwell, 143 E. Guthrie, Madison Heights, Mich.

Continuation of application Ser. No. 218,626, Aug. 22, 1962. This application Oct. 22, 1965, Ser. No. 507,641
4 Claims. (Cl. 179—90)

This application is a continuation of my copending application, Serial No. 218,626, filed August 22, 1962, for Telephone Dialing Alarm Device.

This invention relates generally to alarm devices and particularly to mechanism for dialing a telephone and transmitting a recorded message.

It is an object of my invention to provide an improved telephone operating mechanism.

Another object of the invention is to provide an improved telephone dialing mechanism.

Another object of the invention is to provide an improved telephone dialing mechanism in which a preselected number is periodically dialed by unique control means until the mechanism is shut off.

Another object of the invention resides in the provision of timed controlled means for periodically initiating operation of the dialing mechanism and which is efficient and reliable in operation.

A further object of the invention is to provide an improved telephone operating mechanism having a control system responsive to an alarm condition, such for example as a fire or burglary.

Other objects of the invention will become apparent from the following detail description, taken in connection with the accompanying five sheets of drawings in which.

Figure 1:
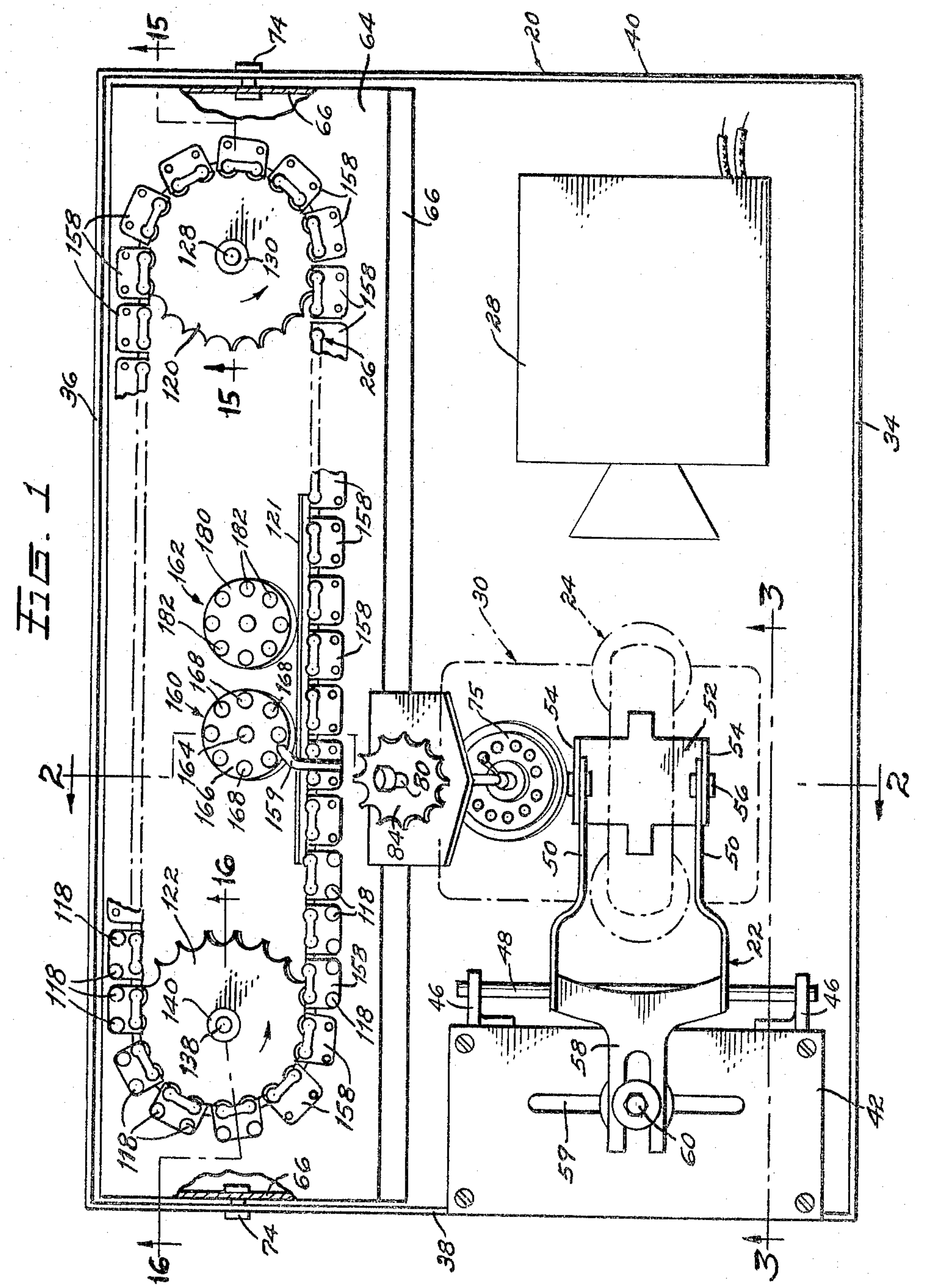
FIG. 1 is a plan view of a telephone operating mechanism embodying features of my invention.

Referring to the drawings by characters of reference, my alarm operating apparatus comprises, in general, a support or casing 20, a lever 22 for lifting a telephone transmitter-receiver 24, a programmed telephone dial operating device 26, and an audible message transmitter or tape recorder 28. The lifter 22, dial operating device 26, and the recorder 28 are all mounted within the casing together with a conventional telephone instrument 30.

The casing 20 is a rectangular shaped box-like structure having a bottom wall 32, side walls 34 and 36 and end walls 38 and 40. Any suitable casing or supporting member may be used.

Figure 3:
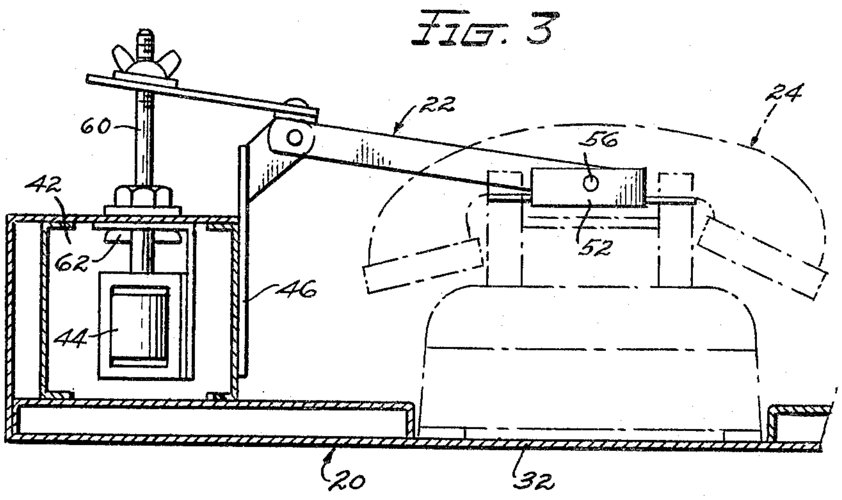
FIG. 3 is a fragmentary vertical sectional view, taken along the line 3—3 of FIG. 1.

Within the casing, adjacent the end wall 38 there is a housing 42 containing a power element or solenoid 44, as shown in FIG. 3, for operating the telephone transmitter-receiver lever 22. Mounted on the solenoid housing 42 by suitable brackets 46 is a fixed horizontal shaft 48 on which the lever 22 is pivoted, the lever preferably being in the form of a bail-type lever. This particular lever 22 has spaced apart parallel arms 50 which are laterally positioned and project over the telephone box, as shown. Carried by and connecting the ends of the arms 50 together is a horizontal support or plate 52 which positions under the telephone transmitter-receiver between the enlarged ends thereof, as shown in FIGS. 1 and 3. In order to insure that the transmitter-receiver sets properly on the plate 52, the plate is provided with opposite upturned flanges 54 which are connected respectively to the arms 50 by pivot pins 56. On the other side of the shaft 48 from the arms 50, the lever 22 has an arm 58 which is connected by a connecting rod 60 to the movable armature 62 of the solenoid 44. Thus, it will be apparent that when the solenoid 44 is energized it will pivot the lever 22 to lift the transmitter-receiver 24 so as to close the telephone circuit which, as is well known, is normally held open by the weight of the transmitter-receiver. The bifurcated end of lever arm 58 and a slot 59 transverse thereto in the top of housing 42 provide for universal adjustment of the arm 22 relative to the transmitter-receiver 26 of the telephone.

Positioned to the right of and adjacent the telephone 30 is the audible message transmitter 28 and this device is activated at the same time that the telephone transmitter-receiver is lifted from its cradle, as will hereinafter be more fully understood. The device designated by the numeral 28 may be a record player of any suitable type, preferably driven by an electric motor (not shown).

Figure 2:
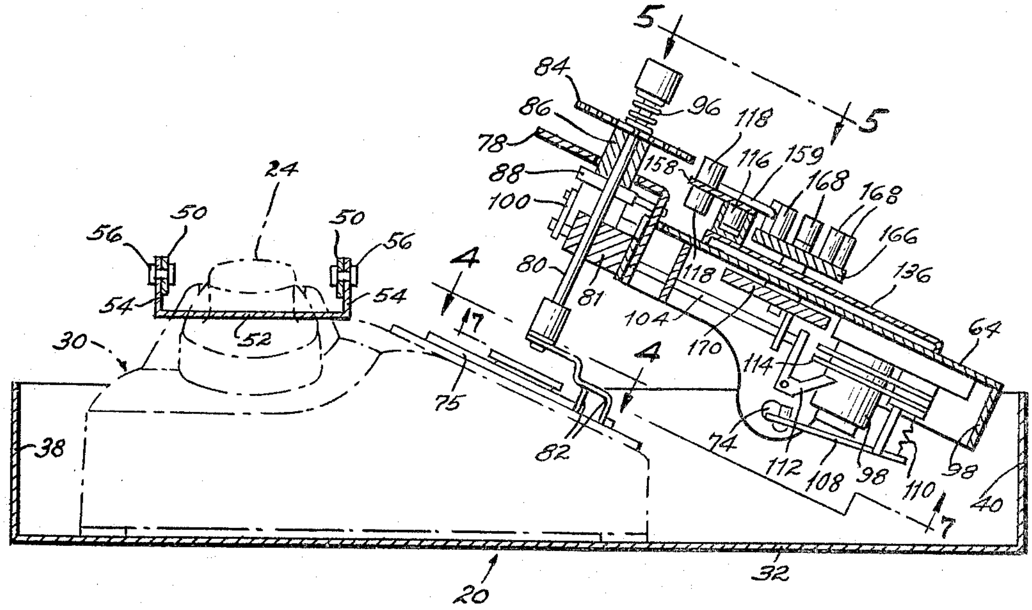
FIG. 2 is a cross sectional view of the mechanism, taken along the line 2—2 of FIG. 1.
Figure 5:
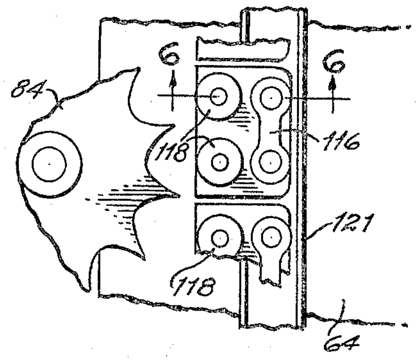
FIG. 5 is an enlarged fragmentary plan view, taken in the direction of the arrows 5—5 of FIG. 2.

A rectangular supporting member or mounting plate 64 is mounted on the end walls 38, 40 of the casing 20 and supports the components of the telephone dialing mechanism, including the operating mechanism 26. The plate 64 spans the ends 38 and 40 of the casing 20 adjacent side wall 36 and preferably is formed with downturned opposite side flanges 66 and 68 and end flanges 70 and 72. At its end flanges 70 and 72, the plate 64 is mounted by pins 74 to the casing sides, the plate being angularly disposed to the horizontal such that the plate is substantially parallel to the telephone dial 75, as shown in FIG. 2. Any suitable adjustment may be provided to adjust the angularity of plate 64 to the angularity of different types or designs of telephones.

Figure 4:
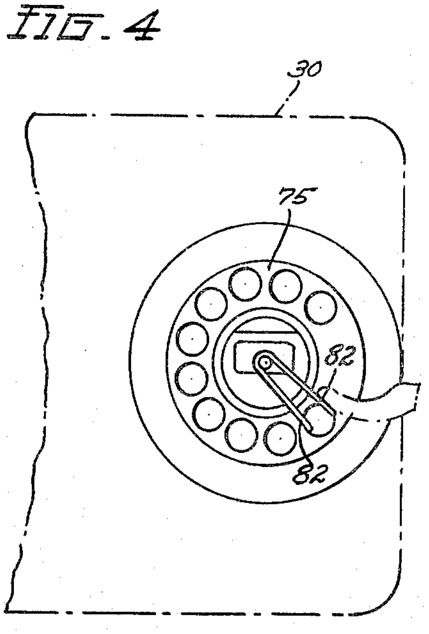
FIG. 4 is a fragmentary plan view, taken in the direction of the arrows 4—4 of FIG. 2 showing principally the dial of a currently conventional telephone.

A bracket is mounted on the plate flange 66, such as by welding, and has a leg 78 which projects over the telephone dial 75 in spaced relation thereto. Extending through an aperture in the leg 78 there is a rotatable shaft 80 which is rotatably mounted in a mounting bracket 81 which in turn is mounted on the side flange 66 of plate 64. The axis of the shaft 80 aligns, or is substantially coaxial with the axis of rotation of the telephone dial 75. Affixed to the lower end of the shaft 80, I provide a pair of angularly spaced apart fingers 82 having downwardly directed end portions to engage in one of the finger holes of the telephone dial, as shown in FIGS. 2 and 4. Preferably the fingers 82 are resilient and may be made of suitable spring wire.

Figure 13:
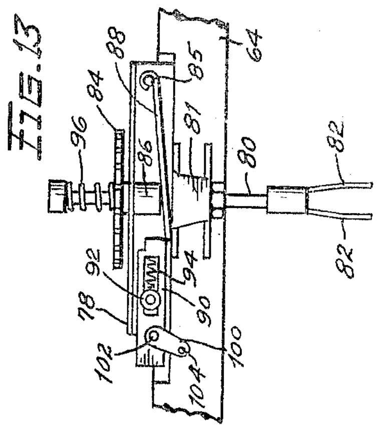
FIG. 13 is a view like FIG. 12 with the operating parts shown in positions they will assume when dialing a different programmed call number.
Figure 14:
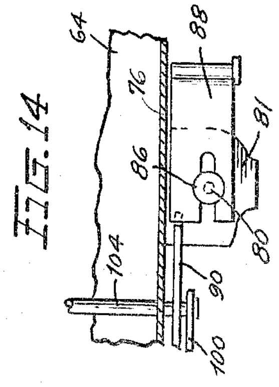
FIG. 14 is a fragmentary plan view, taken in the direction of the arrows 14—14 of FIG. 12.
Figure 12:
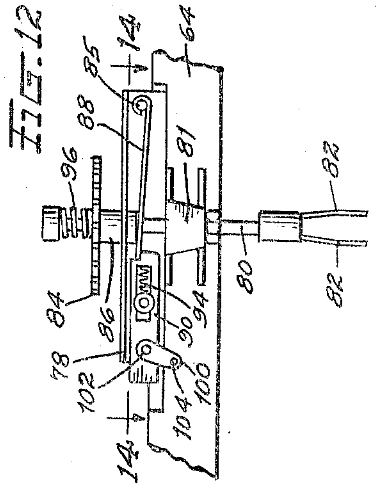
FIG. 12 is a fragmentary elevational view, taken in the direction of the arrows 12—12 of FIG. 7, showing certain of the operating parts in positions they will assume when dialing a programmed call number.

On shaft 80, adjacent the upper end thereof is a driven gear 84 having a hub 86 on the underside thereof which is keyed to the shaft to provide a driving connection between the shaft and the driven gear. Also, the key provides for the shifting of the gear between its normally "up" position, shown in FIG. 12, and its "down" position shown in FIG. 13, the purpose of shifting the gear being hereinafter described in detail. A latch member 88 and a retractable keeper 90 cooperate and normally hold the gear 84 in its "up" position. The latch member 88 is pivoted on a pin 85 at one end thereof to the upright leg of bracket and the other end of the latch member is bifurcated to receive the shaft 80 and abut the underside of the gear hub 86. The retractable latch keeper 90 has an elongated horizontal slot as seen in FIG. 13 to receive a guide pin or stud 92 which is affixed at one end thereof to the bracket 76 to guide the keeper. One end of the keeper 90 has a notch providing a seat for the bifurcated end of the latch member 88 and is biased into latching position by a suitable coil spring 94. Also the notched end of the retractable keeper 90 is rounded to provide a cam to hold the latch member in "down" position as shown in FIG. 13. A helical coil spring 96 is free to move the gear down to the "down" position upon retraction of the keeper 90 which, as will later be understood, returns to latched position immediately following release of latch member 88 since the keeper is operated by a pulsing of a solenoid 98.

Figure 9:
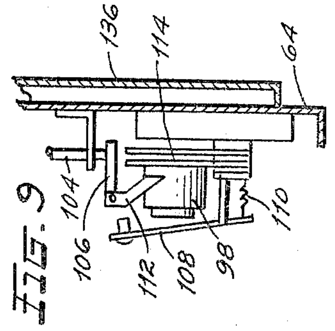
FIG. 9 is a fragmentary cross sectional view, taken along the line 9—9 of FIG. 7.
Figure 8:
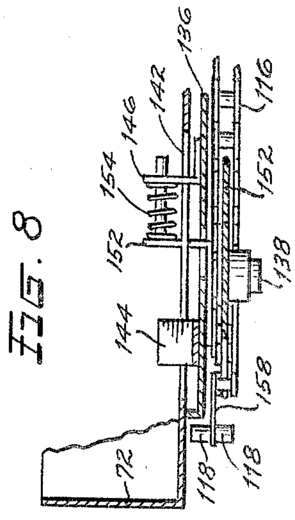
FIG. 8 is a fragmentary sectional view, taken along the line 8—8 of FIG. 7.

The retractable keeper 90 is operatively connected to the solenoid 98 by interconnecting mechanism which includes a lever arm 100 which has one end pivotally connected to the keeper, as at 102. The other end of the lever arm 100 is affixed onto a rotatable shaft 104 which extends crosswise beneath plate 64 and has a second lever arm 106, FIG. 9, affixed thereto. The solenoid 98 includes a pivotal armature or clapper 108 having its free end overlying lever 106 to engage and operate the lever. As a consequence, when the solenoid 98 is pulsed, the clapper 108 is pivoted against the opposition of a return spring 110 whereupon the lever 106 is pivoted to rotate shaft 104 and through the arm 100, retract the latch keeper 90 for an interval sufficient to release the latch member 88. An extension member 112 carried by arm 106 engages and moves a switch member 114 to closed position at the same time that the retractable keeper 90 is retracted. The purpose of the switch is hereinafter explained in connection with the control system illustration of FIG. 17.

Referring now more particularly to the dial operating mechanism 26, this mechanism is mounted on the supporting plate 64 and comprises a telephone dialing program carrier or endless chain 116, and a plurality of telephone dialing program members or pins 118. The chain 116 travels about a pair of sprockets 120 and 122 which are spaced apart longitudinally of the supporting plate 64 such that one side of the chain or lead side is presented to the driven gear 84 on the dialing shaft 80. This side of the chain is preferably guided in a channel guideway 121 to limit bowing of the chain. Sprocket 120 is the driving sprocket and is driven by an electric motor 124, FIG. 7, which is part of a unit including speed reduction mechanism that is a well known commercially available unit.

Figure 15:
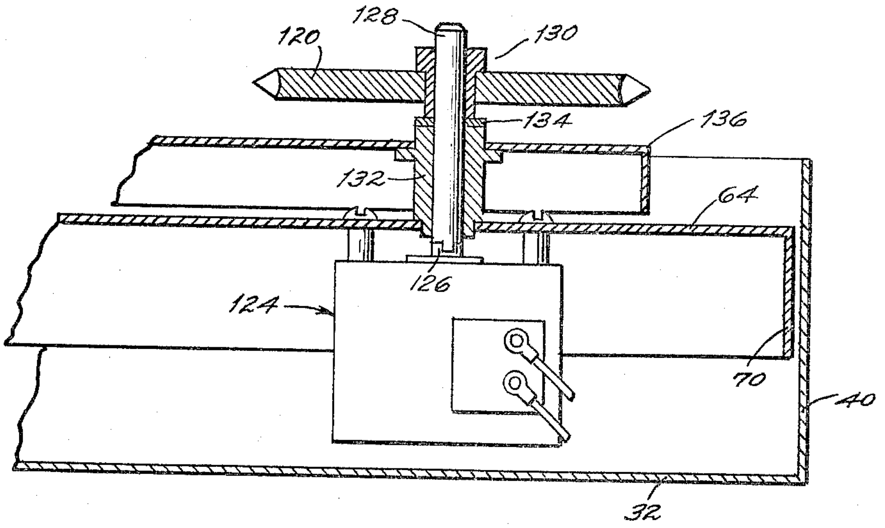
FIG. 15 is a fragmentary sectional view, taken along the line 15—15 of FIG. 1.

As shown in detail in FIG. 15, the motor-gear unit is mounted on and suspended from the underside of the plate 64 by suitable bolts and has an upstanding driving shaft 126 which is coupled to the lower end of a sprocket shaft 128. The chain driving sprocket 120 is fixed onto the shaft 128, such as by means of a set screw in the hub of the sprocket and the lower end of the hub rests on the upper end of a fixed hub 132 which is fixed at its lower end, such as by welding, to the plate 64. A hardened long wearing washer 134 is preferably provided between the hub of sprocket 120 and the upper end of the fixed hub 132.

Figure 7:
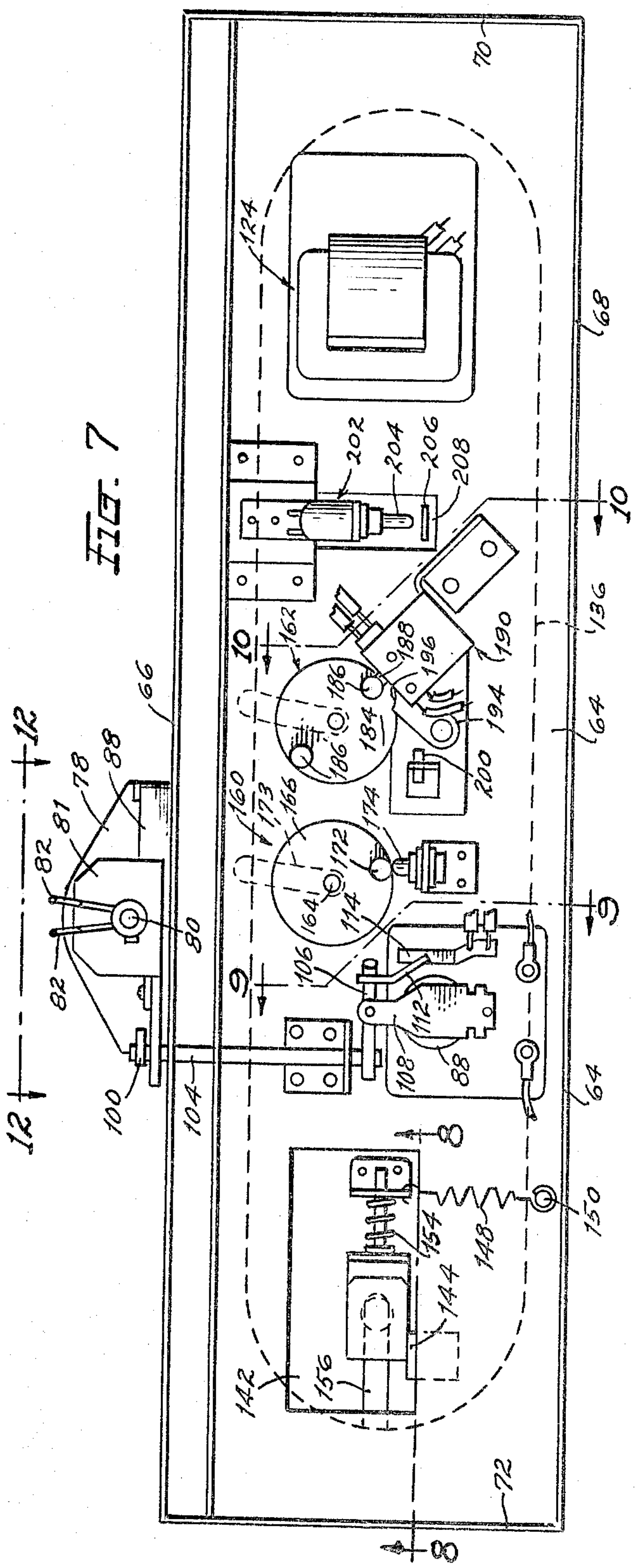
FIG. 7 is a bottom view taken substantially along the line 7—7 of FIG. 2.
Figure 10:
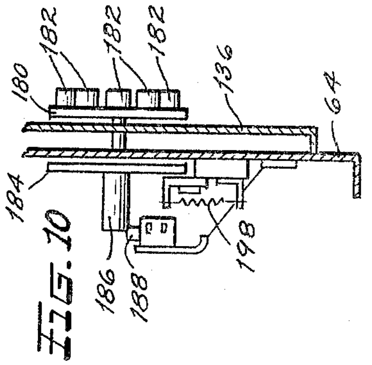
FIG. 10 is another fragmentary cross sectional view, taken along the line 10—10 of FIG. 7.
Figure 11:
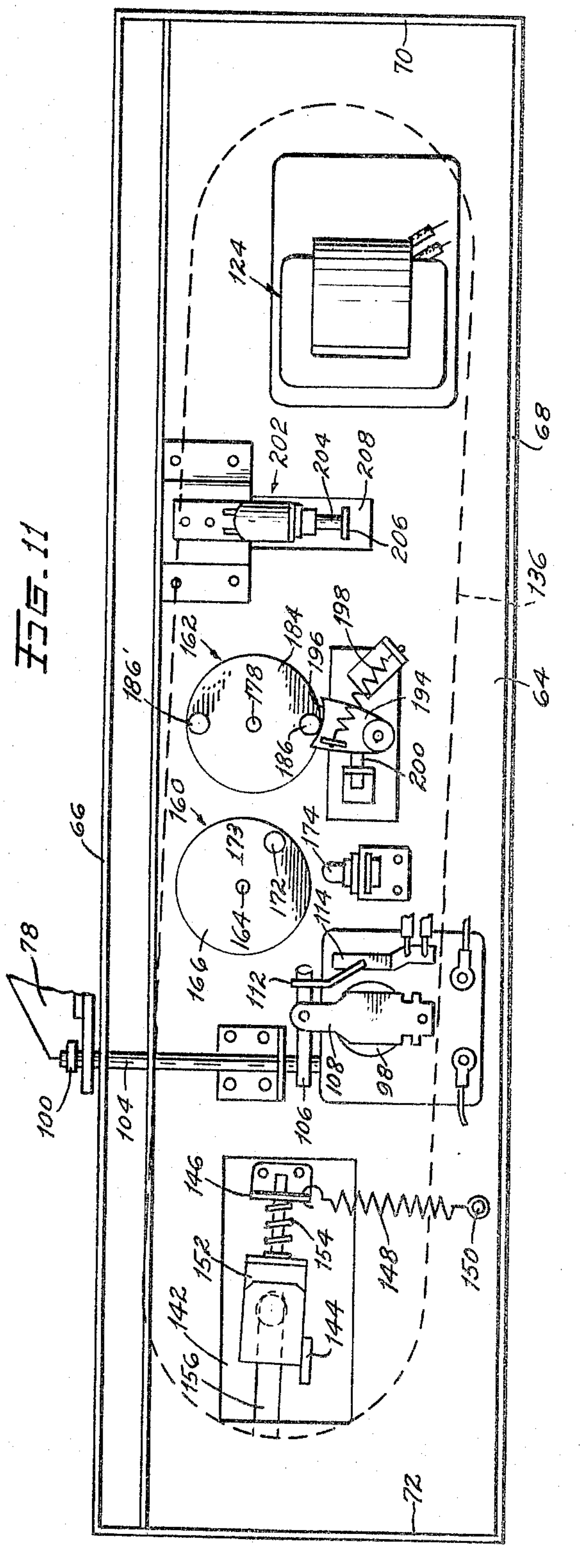
FIG. 11 is a view similar to FIG. 7 showing certain operating parts in positions they will assume during the dialing operation of the mechanism.
Figure 16:
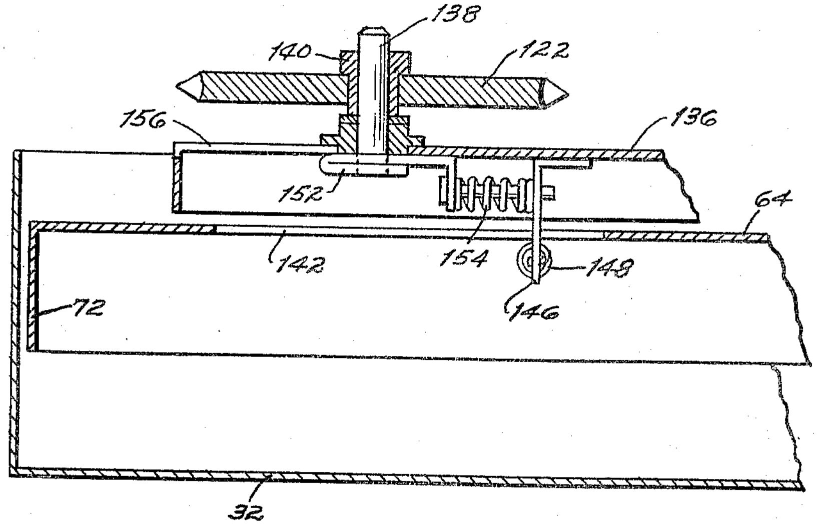
FIG. 16 is another fragmentary sectional view, taken along the line 16—16 of FIG. 1.

Between the sprocket 120 and the supporting plate 64 is one end of a pivotal carrier 136 for the other or guide sprocket 122, the carrier being pivoted on the fixed hub 132 The carrier 136 is an elongated support which may be a sheet metal plate The end carrying the guide sprocket 122 is free so that the carrier may pivot about hub 132 to move the chain carried programmed dialing pins 118 into mesh with the gear 84. As shown, in FIG. 16, the guide sprocket 122 is mounted to rotate on a fixed shaft 138 which is secured in and to a hub 140 that in turn is fixed in and to the free end of the pivotal carrier 136. A clearance opening 142 in plate 64 is provided for a stop member 144 and a bracket 146, both of which are affixed to the underside of the carrier 136. To the bracket 146 is connected one end of a helical coil spring 148 which has its other end anchored as by a pin 150 to the underside of plate 64. The spring 148 is tensioned to pivot the carrier from the position shown in FIG. 11 to the poistion shown in FIG. 7, limited by the stop member 144 engaging one side edge of the clearance opening 142. Mounted over the lower end of the fixed sprocket shaft 138 there is a bracket 152 and held under compression between this bracket and the bracket 146 is a helical coil spring 154 which functions to take up slack in the chain 116. To allow for slack take-up of the chain 116, the sprocket shaft 138 is mounted in a slot 156 in the carrier 136, the slot 156 extending longitudinally of the carrier, as illustrated in FIGS. 7 and 11.

Figure 6:
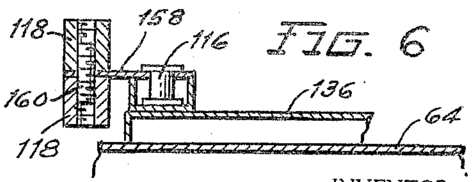
FIG. 6 is an enlarged fragmentary sectional view, taken along the line 6—6 of FIG. 5.

Each of the links of the chain 116 carries a supporting member or plate 158 that is adapted to have the programmed dialing pins 118 secured thereto. As is shown more clearly in FIG. 6, the plates 158 project laterally from the chain 116 and are apertured to receive threaded studs 160 which project above and also below the plates. The pins 118 are tubular and internally threaded to screw-thread onto the ends of the studs. Thus, it will be seen that the present construction provides for programming the dialing mechanism with a set of upper pins 118 to dial a specific number, such as for example, the telephone number of a fire department, and a lower set of pins 118 arranged to dial another number, such as the police department. Although I have shown an arrangement for the selecting and dialing of one or two different telephone numbers, it will be apparent that more than two programs is possible by providing for the shifting of the gear 84 to more than two positions.

In order to provide for a periodic repeat of the dialing operation, I provide timing mechanisms which includes a lug or finger 159 on the chain 116 and a pair of timing components, designated, in general, by the reference characters 160 and 162. The components 160 and 162 are mounted in spaced relationship along the chain guideway 121 inwardly of the path of travel of the chain, as seen in FIG. 1. The timing component 160 comprises a shaft 164 which extends through and is mounted on the pivotal carrier plate 136. An upper portion of the shaft 164 projects above the plate 136 and affixed to this end of the shaft is a disc 166 carrying a plurality of pins 168 on the upper face thereof which pins are rigidly secured to the disc. In the present disclosure there are eight of the pins 168, equally and angularly spaced apart for successive engagement by the chain-carrying finger 159. Obviously, each time that the chain rotates, the finger 159 moves the disc 166 through an angular displacement of 45 degrees. The timing component 160 further includes a disc 170, affixed to the lower end of shaft 164 which carries a single pin 172 extending downwardly therefrom, FIG. 11. Since the lower end of the shaft 164 projects through the plate 64, the plate is provided with a clearance opening 173 (see FIG. 7) to allow for pivoting of the pivotal carrier 136. In the home or starting position of the mechanism, the pin 172 is holding a switch member or plunger 174 (see FIG. 7) depressed, which is in open position, as illustrated diagrammatically in FIG. 17, the switch being biased to closed position by a spring 176.

Figure 17:
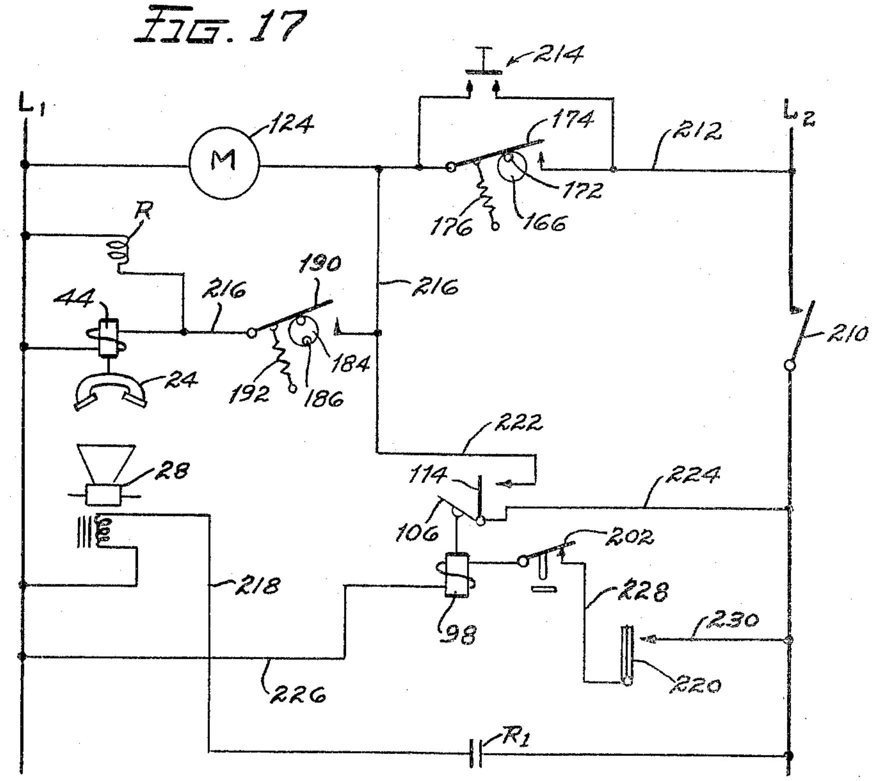
FIG. 17 is a diagrammatical illustration of the telephone operating control system and circuitry therefor.

The other timing component 162 is similar to component 160 and has a shaft 178 journaled for rotation on the pivotal carrier 136. Secured on and to the upper end of the shaft 178 there is a disc 180 which like disc 64 carries eight equally and angularly spaced apart pins 182. Also, on its lower end the shaft 178 carries a disc 184 to the underside of which is secured two diametrically oppositely positioned pins 186 and 186' that project downwardly. As shown in FIGS. 7 and 17, one of the pins 186 is normally holding a switch plunger 188 depressed and a switch member 190 open against the closing action of a spring 192.

Pivotally mounted on the supporting plate 64 there is a cam 194 having a concavely formed free end 196. With particular reference to FIG. 11, it will be seen that the cam 194 is arranged such that a portion of its concave surface at the left edge thereof is in the path of the pins 186. In this position, the cam 194 is normally held by a spring 198. When one of the pins 186 on the rotatable disc 184 engages the concave surface of cam 194, the cam is pivoted counterclockwise until it engages a stop 200 during which time, the cam pivots the pivotal carrier 136 to the position shown in FIG. 11 for engagement of either the upper or lower sets of dialing pins 118, as the case may be, with the driven gear 84.

A normally closed switch 203 is provided as a safety cut-out switch for a purpose which is hereinafter explained in the description of operation. The switch 202 is mounted on the underside of the supporting plate 64 and is a conventional type of switch having a plunger 204. Mounted on the pivotal carrier plate 136 there is a lug 206 which projects through an opening 208 in plate 64 in alignment with the end of the switch plunger 204. From an inspection of FIGS. 7 and 11 it will be seen that normally the lug 206 is spaced from the plunger 204 and that when the carrier is pivoted to dialing position, the lug engages and depresses the plunger 204 to break the switch contacts.

Referring now particularly to the diagrammatic circuit illustration of FIG. 17, it will be seen that the main lines are designated L1 and L2 and in L2 there is the usual line switch 210. Connected in series across the lines L1 and L2, by a lead 212, is the motor 124 and the switch member 174. A switch 214 is connected to the lead 212 in shunt circuit with respect to switch 214. Although this switch is diagrammatically represented as a push button switch, it is to be understood that it may be a burglar alarm switch in a circuit connected for energization by the opening of doors or windows of a building. Also connected in series with the switch 174 is the switch 190 and the telephone receiver lifting solenoid 44. The connection includes a lead 216 having one end connected to lead 212, between motor 124 and switch member 174, and the other end connected to main line L1. The speaker of the record player 28 is connected across the main lines L1 and L2 by a lead 218 and in this lead is a pair of normally open contacts R1 of a relay R. The relay R is connected at one end to lead 216 and at the other to main line L1 so that the relay will be energized when both of the switches 174 and 190 are closed. The switch 114 is operable to start the motor 124 independently of switch 214 under the control of a second alarm responsive switch 220. The switch 220 is illustrated as a thermostat to respond to increase in temperature in a building in the event of a fire. The fixed contact of switch 114 is connected by a lead 222 to lead 216 and thus to motor 124 and the movable contact of the switch is connected by a lead 224 to the main line L2. A lead 226 connects one end of the coil of solenoid 98 to main lead L1, and a lead 228 connects the other end of the coil to the movable contact of the thermostat 220, the fixed contact of which is connected by a lead 230 to the main line L2. Connected in lead 228 between the solenoid 98 and the thermostat 220 is the safety switch 202.

*Operation*

Assuming that the line switch 210 has been closed and the dialing gear 84 is in its normally "up" position, if switch 214 is closed either manually or for some other reason requiring the help of the police, the motor 124 is immediately energized and drives the chain 116. At the start of the driving of chain 116, the finger 159 carried thereby first rotates disc 166 and then disc 184 to successively release switches 174 and 190. When this occurs, the telephone receiver lifter solenoid 44 is energized and also the recorder 28. When the disc pin 186 is moved away from the release switch 190, the pin immediately thereafter engages the concavely formed cam 196 on the end of lever 194 and pivots the lever in a counterclockwise direction, facing FIG. 7, and the cam causes the chain carrier 136 to pivot about the hub 132 to the position shown in FIG. 11. In this position, the chain has been moved toward the dialing gear 84 so that the upper pins 118 mesh with the teeth of gear 84. When the carrier 136 is pivoted to the position shown in FIG. 11 the switch 202 is opened, but this has no effect at this time since the thermostat 220 is also open. As the chain 116 travels about its sprockets 120, 122, a series of the upper pins 118 will rotate the gear 84 and cause the telephone dial 75 to be rotated through an angular displacement corresponding to a digit of the number being called. At the end of this first series of the upper pins 118 and the next series of pins, there is a separation which allows the dial spring of the telephone to return the dial to its starting position. Then, the next series of pins 118 dials the next digit of the number being called and so on until completion of the dialing of the number. This dialing operation takes place within the time required for one complete turn of the chain 116. When the chain 116 has traveled one complete turn, the finger 159 carried thereby again moves each of the discs through a one-eighth turn or forty-five degrees which has no effect on the switches 174 and 190, but disengages disc pin 186 from the cam lever 194 whereupon spring 148 pivots the carrier 136 back to its normal position and shifts the chain carried pins 118 out of engagement with the dialing gear 84. The chain 116 continues to travel and after completing four turns, the switch controlling pin 118' depresses switch plunger 188 and opens switch 190. As a consequence, the circuit of the receiver lifting solenoid 44 is broken and the receiver is then lowered to its normal position in the cradle of the telephone instrument, closing the telephone circuit. At the same time, the relay R is deenergized when switch 190 opens and the record player 28 is stopped. Following the completion of the fifth rotation of the chain 116, the finger 159 again rotates the two discs 166, 184 and pin 118' releases the switch 190 and engages the end 194 of 194 whereupon the carrier 136 is again shifted to the position shown in FIG. 11 in which the upper dialing pins 118 on the chain are again meshed with the dialing gear 84 to repeat the dialing operation. This continues until the machine is shut off by the opening of line switch 210.

When the other alarm switch, or thermostat 220 closes, a circuit is completed from main line L1 through a solenoid 98, the normally closed switch 202 and the now closed thermostat 220. This energizes the solenoid 98 which pivots lever 106 to close switch 114 to start the motor 124. The pivoting of lever 106 (FIGS. 11, 12 and 13) also rotates shaft 104 to retract the latch keeper 90 whereupon spring 96 thrusts and holds the dialing gear 84 in its "down" position. In this position, the dialing gear 84 is meshed with the lower ones of the programmed pins 118, carried by the chain 116. As previously mentioned, the lower pins 118 are grouped in numbers of pins with each group representative of a digit of the number to be dialed. The operation of the machine in dialing the number represented by the lower pins 118 is the same as the operation previously described in connection with the upper pins 118. The dialing gear is reset in its "up" position by manually raising the gear. This allows the keeper 90 to return to its normal or latch holding position.

While I have shown and described my telephone dialing alarm system in considerable detail, it will be apparent that many variations and changes may be made therein without departing from the spirit and scope of the invention.

I claim:

1. In an automatic telephone dialing apparatus having a rotatable dial member biased to return to a home position and an aperture in the dial member, a rotatable finger to engage in the dial member aperture, a gear rotatable with said finger, a carrier positioned to travel in a plane substantially transverse to the axis of rotation of said gear, said gear and said carrier in spaced apart relationship, a plurality of spaced apart sets of pins carried by said carrier in spaced apart relationship therealong to mesh with said gear, each of said sets of pins representative of a digit of a predetermined number to be dialed, a shiftable supporting member supporting said carrier, said supporting member normally in a position to effect disengagement of said pins from said gear, and means to shift said supporting member to a position to effect engagement of said pins with said gear and carried by said pin carrier.

2. In an automatic telephone dialing apparatus for operating a rotatable dial member biased to return to a home position, supporting means, a rotatable finger to engage the dial member, a gear rotatable with said finger, a carrier positioned to travel in a plane substantially transverse to the axis of rotation of said gear, said gear and said carrier in laterally spaced apart relationship, a plurality of spaced apart sets of pins carried by said carrier with the pins of each set in spaced apart relationship corresponding to the spaced apart relationship of the teeth of said gear, each of said set of pins representative of a digit of a predetermined number to be dialed, a pivotal supporting member supporting said carrier, said supporting member pivotal from a normal position in which said pins are disengaged from said gear to a position in which the pins mesh with said gear, a rotatable member mounted on said supporting member, a cam mounted on said supporting means, and an abutment member carried by said carrier to engage and rotate said rotatable member against said cam to pivot said supporting member to engage said pins with said gear.

3. In an automatic telephone dialing apparatus for operating a rotatable dial member biased to return to a home position, supporting means, a rotatable finger mounted on said supporting means to engage the dial member, a gear rotatable with said finger, a platform pivoted on said supporting means, laterally positioned from said gear, to pivot toward and away from said gear, a pair of sprockets including a driving sprocket and a driven sprocket mounted on said platform, the axis of said driving sprocket being coaxial with the pivot of said platform, a continuous chain driven and guided by said sprockets, a plurality of sets of pins carried by said chain and spaced therealong and with the sets in spaced apart relationship, said pins corresponding to the spaced apart relationship of the teeth of said gear, each of said set of pins being representative of a digit of a predetermined number to be dialed, a spring normally holding said platform in a position with said pins disengaged from said gear, a cam on said supporting means, a rotatable abutment member on said platform rotatable into engagement with said cam to pivot said platform to engage said pins with said gear, and an actuator carried by said chain to rotate said abutment member.

4. In a telephone dialing apparatus of the character of claim 3, a motor to drive said driving gear, and a switch member controlling said motor and actuated by said actuator subsequently to actuation of said cam.

References Cited by the Examiner

UNITED STATES PATENTS

| | | | |
|---|---|---|---|
| 2,432,483 | 12/1947 | Miller et al. | 192—24 |
| 2,780,671 | 2/1957 | Thery | 179—5 |
| 2,830,119 | 4/1958 | Zimmerman | 179—5 |
| 2,907,828 | 10/1959 | Tegler | 179—5 |
| 2,952,740 | 9/1960 | Montrose | 179—5 X |

KATHLEEN H. CLAFFY, *Primary Examiner.*

J. W. JOHNSON, *Assistant Examiner.*